US004001629B2

United States Statutory Invention Registration [19]

[11] Reg. Number: H1629

[45] Published: Jan. 7, 1997

Riehle et al.

[54] POLY(AMINOAMIDEUREYLENE) RESIN, ITS SYNTHESIS, AND ITS USE IN PAPER AND PAPERBOARD MANUFACTURE

[75] Inventors: Richard J. Riehle; Ronald R. Staib, both of Wilmington, Del.

[73] Assignee: Hercules Incorporated, Wilmington, Del.

[21] Appl. No.: 375,063

[22] Filed: Jan. 19, 1995

Related U.S. Application Data

[62] Division of Ser. No. 194,601, Feb. 10, 1994, abandoned, which is a continuation of Ser. No. 177,111, Jan. 3, 1994, abandoned.

[51] Int. Cl.[6] ..... C08F 283/04

[52] U.S. Cl. ..... 525/426; 525/435

[58] Field of Search ..... 525/419, 420, 525/426, 430, 435; 524/608

[56] References Cited

U.S. PATENT DOCUMENTS

| | | | |
|---|---|---|---|
| 3,332,901 | 7/1967 | Keim . | |
| 3,966,684 | 6/1976 | Espy et al. | 525/430 |
| 4,354,006 | 10/1982 | Bankert . | |
| 4,388,439 | 6/1983 | Maslanka . | |
| 4,419,498 | 12/1983 | Bankert . | |
| 4,419,500 | 12/1983 | Bankert . | |
| 4,501,862 | 2/1985 | Keim . | |
| 4,520,159 | 5/1985 | Maslanka . | |

*Primary Examiner*—Charles T. Jordan
*Assistant Examiner*—John R. Hardee
*Attorney, Agent, or Firm*—Ivan G. Szanto

[57] ABSTRACT

The invention provides a novel poly(aminoamideureylene) resin and a process for making the resin without epichlorohydrin. The resin useful for improving wet strength of paper and paperboard intermediates. The resin is formed by making a prepolymer by reacting a diaminoamine, a dicarboxylic acid, and urea, allylating the prepolymer, and then reacting with hypohalous acid to produce an allylated quaternized poly(aminoamideureylene) having halohydrin substituents with resort to using epichlorohydrin. The resin can be activated for use in a papermaking process by treatment with a caustic (alkaline) agent. Optionally, the resin can be cross-linked prior to activation by heating in the presence of a caustic agent.

The invention also provides an improvement in making polymers having halohydrin substituents formed by reacting an allylated polymer with hypohalous acid wherein the reaction is conducted without control of the pH.

This invention also provides a method for producing hypohalous acid by acidifying an aqueous solution of an alkali metal hypohalite.

34 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLY(AMINOAMIDEUREYLENE) RESIN, ITS SYNTHESIS, AND ITS USE IN PAPER AND PAPERBOARD MANUFACTURE

This application is a division of application Ser. No. 08/194,601 filed Feb. 10, 1994, now abandoned which is a continuation application of U.S. patent application Ser. No. 08/177,111, filed Jan. 3, 1994, now abandoned.

BACKGROUND OF THE INVENTION

1. The Field of the Invention

This invention relates to a novel poly(aminoamideureylene) resin, to a method for its synthesis, and to a novel use of the resin in the manufacture of paper and paperboard products. This invention also relates to improvements in the preparation of halohydrin-substituted polyamines. Lastly, this invention relates to an improved method for the preparation of hypohalous acid.

2. The State of the Art

Paper and paperboard products are generally manufactured by spraying a low solids slurry of pulp (called a "furnish") onto a moving porous conveyor. The water is removed to provide a wet sheet that is subsequently dried and further processed into a paper or paperboard product. Various compositions known as "sizes" are typically added to the furnish to improve the quality of the finished product. Other compositions are typically added to the furnish to facilitate processing; exemplary compositions include agents to facilitate drying of the paper and to increase the wet strength of the paper. These additives typically include polyamines or derivatives thereof which are treated to incorporate into the polymer quaternary ammonium groups and epoxide or halohydrin groups. Particular examples of resins are described by the following patents, the disclosures of which are all incorporated herein by reference.

As described by Keim, in U.S. Pat. No. 3,332,901, examples of such polymers are those having the formula —NH—$(CH_2)_n$—NR—CO—$(A)_m$—CO—, in which R is alkyl or hydroxyalkyl, n is 2 or 3, m is zero or one, and A is an alkylene of one to six carbon atoms, —$CH_2$—NR—$CH_2$—, or —$CH_2$—$CH_2$—NR—$CH_2$—$CH_2$—, and aminopolyesters containing at least one tertiary amino nitrogen in the chain such as —$(CH_2)_n$—NR—$(CH_2)_n$—O—C(O)—$(A)_m$—C(O)O—, and polyaminopolyamides of the formula —NH—$(C_xH_{2x}$—NH$)_y$—CO—Z—CO—, in which x and y are each integers of two or more and Z is the divalent organic radical of a saturated aliphatic dicarboxylic acid containing at least four carbon atoms or an ester of a saturated aliphatic dicarboxylic acid containing at least two carbon atoms.

Maslanka, in U.S. Pat. No. 4,388,439, describes reacting the diester of oxalic acid with methylbisaminopropylamine (MBAPA) to produce a polyaminopolyamide which is subsequently reacted with epihalohydrin. The resin is stabilized with acids such as hydrochloric or hydrobromic.

Keim, in U.S. Pat. No. 4,501,862, describes a wet-strength resin derived from aminopolyamine-polyureylene, in which oxalic acid or its diester is reacted with urea and MBAPA to produce a resin that is subsequently reacted with epihalohydrin. The molar ratio of the oxalic acid to the urea ranges respectively from 0.1:1 to 10:1; and the molar ratio total of these components to the MBAPA ranges respectively from 0.9:1 to 1:2.

Maslanka, in U.S. Pat. No. 4,520,159, describes a process for producing polyaminopolyamides with halohydrin moieties by the reaction of a polyalkyleneamine having at least one secondary amine group with a dicarboxylic acid. The polyaminopolyamide is then reacted with allyl halide at a ratio of one to 1½ mole per mole of secondary amine groups in the polymer to provide thereon a group convertible to a halohydrin moiety by the reaction of hypochlorous acid.

Bankert, in U.S. Pat. No. 4,419,500, describes the production of quaternized polyaminoureylenes having a halohydrin functionality by first reacting urea and a polyamine to produce a polyaminoureylene having at least one tertiary amine group, and then reacting the polymer with an allyl halide to provide a quaternized polymer having allyl-substituted quaternary nitrogens. The allyl substituents can be converted to halohydrin moieties by the reaction of hypohalous acid. Similar processes are described by Bankert in U.S. Pat. No. 4,354,006 and U.S. Pat. No. 4,419,498.

The use of epihalohydrins, and particularly epichlorohydrin, as the quaternizing agent for tertiary amine groups has become environmentally undesirable because of the toxicity of such compounds. Further, because substantially complete quaternization of the tertiary amine groups with the epihalohydrin in practice requires using an excess of the reagent, expensive recovery and purification techniques must be employed to produce a paper or paperboard product sufficiently free from epihalohydrin material. Accordingly, some of the aforecited patents describe reacting polyamines containing tertiary amines with an equimolar amount of an allyl halide compound to quaternize the tertiary amine groups, and then reacting the resulting product with hypohalous acid to convert the allyl moieties to the corresponding halohydrin moieties.

SUMMARY OF THE INVENTION

The present invention provides a novel resin of the general partial formula (I)

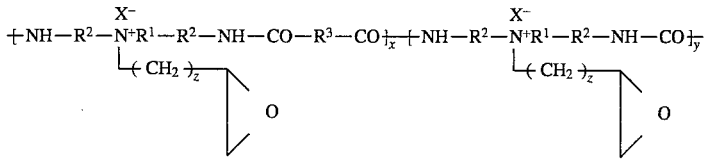

(I)

wherein the approximate ratio of x:y is between 4:1 and 1:4, $X^-$ is an anion (preferably halogen), $R^1$ is an alkyl group, and the two $R^2$ moieties and $R^3$, which may be the same or different, are each independently chosen as an alkyl group, or $R^3$ may be omitted entirely. In preferred embodiments the resin is cross-linked. The resin of formula (I) is the activated form of the analogous polymer having halohydrin groups, which are converted to the epoxide groups shown in the formula by reaction with an alkaline material.

This invention also provides a process for producing a novel polymer by the steps of (A) reacting (i) diaminoamine, (ii) a dicarboxylic acid or a derivative thereof, and (iii) urea to produce a poly(aminoamideureylene), (B) reacting the poly(aminoamideureylene) produced in step (A) with an allyl halide to produce a quaternized allylated poly(aminoamideureylene), (C) reacting the quaternized allylated poly(aminoamideureylene) produced in step B with hypohalous acid to produce a quaternized halohydrin-substituted poly(aminoamideureylene), (D) reacting the quaternized halohydrin-substituted poly(aminoamideureylene) produced in step C with a caustic material in an amount effective to convert the halohydrin substituents to epoxide substituents to produce a quaternized epoxide-substituted poly(aminoamideureylene). In preferred embodiments, the allylation reaction of step B is not conducted to completion, and, after reaction with hypohalous acid in step C, a cross-linking reaction is performed prior to step D by the addition of an amount of caustic effective to increase the viscosity of the polymer, and then crosslinking is terminated by the addition of an acid; the acid is generally added in amounts effective both the terminate the cross-linking reaction and to convert the epoxide moieties into halohydrins. In embodiments preferred for producing a resin suitable for use in papermaking processes, the process may further comprise (E) reacting a crosslinked epoxide-substituted poly(aminoamideureylene) produced in step D with an amount of acid effective to convert the epoxide substituents to halohydrin substituents and thereby provide a storage-stable resin.

This invention further provides a process of using the novel resin as an additive in papermaking, which process comprises providing the resin in an aqueous solution and adding the solution to a furnish to be used in the manufacture of paper or paperboard products; a "furnish" is the low solids pulp slurry from which paper and paperboard products are made. The invention thus also provides a process of making a paper or paperboard product, which process comprises providing a furnish suitable for making such a product, providing the novel polymer in an aqueous solution and adding the solution to the furnish, forming a wet-laid sheet from the furnish, and drying the wet-laid sheet to form a paper or paperboard product.

In yet another embodiment, this invention provides a novel process for the production of hypochlorous acid by providing an aqueous solution of an alkali metal hypochlorite and acidifying the aqueous solution with a mineral acid to a pH of about 4–6.

DETAILED DESCRIPTION OF SPECIFIC EMBODIMENTS

The invention pertains first to a poly(aminoamideureylene) derived from a diaminoamine, a dicarboxylic acid or a derivative thereof, and urea, which is shown in formula (I).

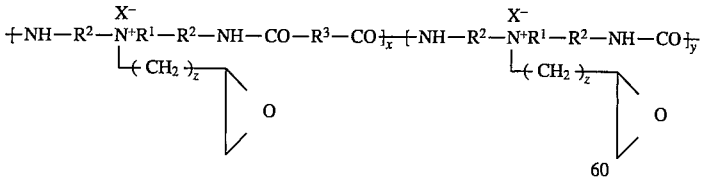

(I)

Substituents $R^1$, $R^2$, and $R^3$ are hydrocarbyl and generally may be independently chosen as acyclic, cyclic, aliphatic, either straight or branched chain, or aromatic groups.

Suitable diaminoamines can be of the general formula $NR^1(R^2NH_2)_2$, wherein $R^1$ is an alkyl group, and the two $R^2$ moieties, which may be the same or different, are each independently chosen as an alkyl group. More preferably, $R^1$ is a $C_{1-4}$ alkyl group and each $R^2$ is independently chosen as a $C_{1-6}$ alkyl group. Most preferably, $R^1$ is methyl or ethyl and each $R^2$ is independently ethyl or propyl, and especially preferred is where each $R^2$ is the same and is ethyl or propyl. A preferred diaminoamine is where $R^1$ is methyl and each $R^2$ is propyl, i.e. methyl-bis(3-aminopropyl)amine ("MBAPA").

The dicarboxylic acid is generally represented by the formula HOOC—$R^3$—COOH, wherein $R^3$ is a $C_{1-6}$ alkyl group or is omitted. Derivatives of the dicarboxylic acid, such as an alkyl or aryl mono- or diester, as well as mixtures of dicarboxylic acids, may be used. Oxalic acid, HOOC—COOH, in which $R^3$ has been omitted, is a preferred dicarboxylic acid.

The third monomer in this novel polymer is urea, $H_2N$—C(O)—$NH_2$.

The diaminoamine, dicarboxylic acid, and urea are combined in an aqueous medium and heated to produce a poly(diaminoamine-co-carboxylic acid-co-urea) of the formula (II).

$$\left[NH-R^2-NR^1-R^2-NH-CO-R^3-CO\right]_x\left[NH-R^2-NR^1-R^2-NH-CO\right]_y \quad \text{(II)}$$

wherein x is the mole fraction of dicarboxylic acid (or its derivative) reacted and y is the mole fraction of urea reacted. The dicarboxylic acid and the urea are preferably present in a molar ratio, respectively, of from 4:1 to 1:4, more preferably from 3:1 to 1:3; and most preferably the ratio of x:y is from 2:1 to 1:2, and especially where the ratio is approximately 3:2. The most preferred molar ratio of diaminoamine:dicarboxylic acid:urea is approximately 5:3:2. The ratio of the diaminoamine to the combination of dicarboxylic acid and urea is preferably equimolar. As seen from the formula, the polymer has tertiary amine, amide, and ureylene groups. As noted above, each $R^2$ group is independently chosen, and so when they differ (e.g., $R^2_a$ and $R^2_b$) they may be ordered in the above formula in such arrangements as $R_a^2R_b^2R_a^2R_b^2$ and $R_a^2R_b^2R_b^2R_a^2$.

This polymer of formula (III) is then reacted with an allyl halide of the formula $XCH_2$—$(CH_2)_z$—CH=$CH_2$ to quaternize the tertiary amine groups and provide a polymer of formula (III), in which X is a halogen and z is an integer not more than about 5, more preferably not more than about 3, and most preferably z is zero.

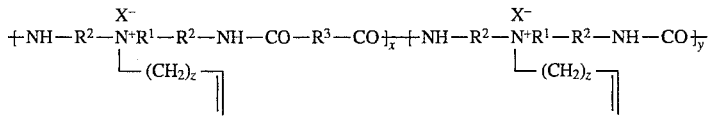

(III)

A preferred allyl halide is allyl chloride ($ClCH_2$—$CH$=$CH_2$). The hydrocarbyl chain of the allyl halide can be straight or branched; an example of a suitable allyl halide including a branched chain is 3-chloro-2-methylpropene ($ClCH_2$—$C(CH_3)$=$CH_2$). Allyl halides more reactive than allyl chlorides, such as allyl bromide and allyl iodide, may be suitable in certain environments, as they generally give better yields. However, reaction in an aqueous medium results in these more reactive allyl halides being converted to allyl alcohol and other toxic and undesirable by-products.

The allyl halide is reacted with the poly(aminoamideureylene) in essentially equimolar amounts based on the mole fraction of tertiary amines in the polymer (i.e., the mole fraction based on the diaminoamine). Respective mole ratios of the allyl halide to the tertiary amine groups are in the approximate range of from 0.2:1 to 5:1, more preferably about 0.5:1 to 2:1, and most preferably about 0.9:1 to 1.2:1. This reaction is preferably conducted at a temperature of at least the reflux temperature of the allyl halide (about 45° C. for allyl chloride at atmospheric pressure) and in an alkaline pH environment until the desired extent of reaction has occurred. It is important to note that a yield of ≦99.95% of quaternized polyamide is desired when the polymer is for use in papermaking; preferably, the extent of quaternization is ≦95%, more preferably about 90% ±3%; in all cases the yield of quaternized polymer should be greater than 0% (i.e., no reaction), more preferably at least 75%, and most preferably at least an 80% yield is desirable. The residual, unquaternized tertiary amines provide reactive sites for cross-linking reactions described below. This allylation reaction is preferably conducted in an alkaline pH (i.e., 7≦pH≦14), preferably at a pH of from 8 to 10, an most preferably in the vicinity of pH 9. It is not necessary to control the pH other than to provide an alkaline medium. When the unquaternized polymer of formula (II) is dissolved in water, the solution exhibits a pH of about 11 due to the tertiary amine groups. As amine groups in the polymer backbone are quaternized during the reaction, the pH gradually falls to near neutral; preferably, the pH is adjusted to be maintained in the vicinity of pH 9. Residual allyl halide can be removed by vacuum stripping or inert gas (e.g., nitrogen) sparging.

The allylated polymer of formula (III) is then treated to convert the allyl moieties into halohydrin moieties; the halohydrin moieties are interconvertable to epoxide moieties suitable for use in papermaking processes, that is, epoxide and halohydrin moieties may be converted from one to the other by the use of caustic or acid. The preferred treating composition for converting the allyl moiety into a halohydrin moiety is hypochlorous acid. (HOCl), which can be prepared: (i) by the acidification of an aqueous solution of alkali metal hypohalite (e.g., sodium hypochlorite, used as household bleach) from a pH of about 11 to a pH of about 4–6; (ii) as a solution in methyl ethyl ketone from calcium hypochlorite, carbon dioxide, and water; and (iii) in situ by chlorine sparging in water or an aqueous solution. The reader is referred to *Kirk-Othmer Ency. Chem. Tech.* (3rd Ed., John Wiley & Sons, vol. 5, pp. 580–609) for a general discussion of hypochlorous acid chemistry; hypochlorous acid is not available "off the shelf" and must be prepared as needed by any number of methods known in the literature.

A preferred method of generating hypochlorous acid for the present invention is by chlorine sparging; the reaction of chlorine and water yields hypochlorous acid and hydrochloric acid, and accordingly an acidic medium: $Cl_2+H_2O \rightarrow HOCl+HCl$; in solution, hypochlorous acid exists in equilibrium with chlorine monoxide as $2HOCl \rightarrow Cl_2O+H_2O$.

The reaction of hypochlorous acid with the allylated polyamine of formula (III) results in addition of hydroxyl and chloro moieties to the allyl moiety, thereby generating chlorohydroxyalkylated quaternary amine groups in the polymer. The reaction is preferably conducted at a temperature in the range of about 0° to 35° C., more preferably in the range of 5° to 30° C., and most preferably in the range of 15° to 25° C.

The addition reaction of hypohalous acid to the polymer of formula (III) is typically employed in the prior art with control of the pH. Unexpectedly, it has now been found that the reaction will proceed essentially to completion if the pH is not controlled, and so this is technique is preferred. Because the resulting resin is so acidic (pH<1), it is also preferred to add a caustic material to raise the pH up to about 2 after the reaction has been completed. Treatment with hypochlorous acid generates predominantly the pendant chlorohydrin moieties shown in the partial formulae as (A) and (B):

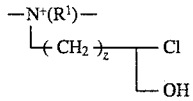

(A)

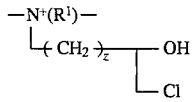

(B)

in which (A) (the 2-chloro-3-hydroxy adduct) is the preferred orientation upon addition to the double bond.

The resulting chlorohydroxyalkyl-substituted polymer will retain the chlorohydrin groups as such while in an acidic medium. For use in papermaking, the polymer can be "activated" by the addition of a caustic or alkaline material (e.g., NaOH, KOH) to convert the chlorohydrin moieties into epoxide moieties. Activation for papermaking (i.e., conversion of halohydrin to epoxide) of the 3-chloro-2-hydroxy adduct can be achieved with essentially equimolar quantities of caustic and polymer, while activation of a mixture of (A) and (B) generally requires about 1.3–1.5 molar equivalents of caustic; excess caustic is also desirable when the resin is destined for use in a neutral or alkaline papermaking process. The epoxide moieties provide desired reactions with cellulose (i.e., forming ester and ether bridges to cellulose) and increase the wet-strength of the paper.

In another aspect of this invention, the polymer having the halohydrin moieties can be cross-linked by heating in the presence of a caustic. In the cross-linking reaction, a minimum amount of caustic is required. The epoxide moieties formed after treatment with caustic cross-link with unreacted tertiary amines existing after the allylation reaction (as noted above, allylation should not proceed to completion), thereby cross-linking the polymer chains and providing moieties shown below as the partial formula (C).

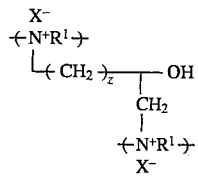

(C)

One practical effect of this cross-linking reaction is an increase in viscosity; the extent of reaction can be estimated from the rate and value of the viscosity increase. The amount of caustic at which gelation starts, and hence viscosity increases, can be determined by routine experimentation and defines the approximate maximum amount of caustic to be added. There will be some cross-linking even without an appreciable increase in viscosity, and so the onset of gelation can be used as a practical upper limit to the amount of caustic added and the extent of cross-linking achieved. The desired extent of cross-linking may be determined with reference to the Gardner-Holdt viscosity scale, which spans from a lowest viscosity designated A to a highest viscosity designated Z (i.e., alphabetically). Prior to cross-linking, the polymer of formula (III) has a Gardner-Holdt viscosity of less than A. In the use of this invention for papermaking, cross-linking should be conducted effective to provide a Gardner-Holdt viscosity in the range of A to I, more preferably in the range of C to G, and most preferably in the range of D to E.

When the desired extent of cross-linking has occurred, the reaction is halted with the addition of an acidic agent (e.g., HCl) to lower the medium to a pH of about 2. This acid stabilization step stops the cross-linking reaction and converts the epoxide moieties back into chlorohydrin moieties. At this point, the resin can be stored for one or two months in this stabilized condition. The resin is stored at about 10–25 wt. % solids, typically about 20 wt. % solids, in an aqueous medium. When needed for addition in the papermaking process, the resin solution is preferably diluted to 1–10 wt. % solids, typically about 5 wt. % solids, and about 1.3 to 1.5 molar equivalents of caustic are added at room temperature (i.e., a molar excess based on the equivalent quantity of chlorohydrin moieties because the highest level of epoxide generation is desired). In general, 0.01–10 wt. % of the resin based on the dry weight of the paper is used for improving wet strength, more preferably 0.05–5%, and most preferably 0.1–3% by weight is used.

The invention will now be further described with reference to the following examples without limitation to the particular reactants and conditions described.

EXAMPLE (A) Prepolymer preparation: a poly(aminoamideureylene) was made by first heating one equivalent of MBAPA and 0.6 equivalent of oxalic acid to 185° C. for one hour. The reaction mixture was cooled to 170° C. and 0.4 equivalent of urea was added. The mixture was heated again to about 185° C. for one hour. The resulting molten polymer was dissolved in water at about 70° C. to a dilution of about 25% solids (15% to 60% solids by weight is suitable).

(B) Allylation: the poly(aminoamideurcylene) prepared in step (A) was charged to a suitably-sized 4-neck round bottom flask fitted with a paddle-type mechanical stirrer, thermometer, stopper, and condenser. Water and NaOH were added to provide a solution of 25%–35% solids at a pH of 11. Allyl chloride was added to the flask via syringe. The mixture was heated to the reflux temperature of allyl chloride (44°–45° C.) and held for one hour under reflux. The temperature was then raised to 60° C. and held there for three hours. Over various allylation reactions, the allylated product pH ranged from 7 to 8.5. Residual allyl chloride was removed either by vacuum at 60° C. or by cooling the product to room temperature and sparging with nitrogen for about one half hour.

(C) Chlorohydrin syntheses (I) The allylated poly(aminoamideureylene) resulting from step (B) was reacted with hypochlorous acid created in situ by sparging with chlorine; although chlorine is extremely toxic, it has generally been used safely in industrial processes for many years and there is no waste- or by-product disposal problems. Various aqueous solutions of 15%–60% solids of the allylated polymer were charged to a round bottomed flask fitted with a mechanical stirrer and paddle type stir blade, gas sparge tube with a sintered glass disk, gas outlet, and pH probe. The initial pH of the solution was between 7 and 8.5. The mixture was cooled to 0° C. with an ice/brine bath and sparging with chlorine was begun. The pH dropped rapidly to 0.1 and sparging was continued for about ½ hour. The chlorine stream was then replaced with a nitrogen stream and the product was sparged for about ½ hour to remove residual chlorine. Thereafter, the pH of the solution was adjusted to about 2 by the addition of sodium hydroxide.

(II) As an alternative synthesis, the allylated poly(aminoamideureylene) resulting from step (B) was reacted with hypochlorous acid generated from an acidified solution of sodium hypochlorite. A high solids solution (e.g., 55% solids) of the allylated polymer was charged to a 3-neck round bottom flask equipped with a mechanical stirrer, a paddle stir blade, a chilled addition funnel, and a pH probe. The allylated polymer solution was cooled to 0° C. and the pH was lowered to about 5 with concentrated HCl. Two molar equivalents of household bleach were charged to a separate round-bottomed flask. The temperature of the bleach was lowered to 0° C. and the pH lowered to about 5 with concentrated HCl. The bleach solution was transferred to the addition funnel and rapidly added to the cold resin solution with stirring. The pH of the reaction mixture was maintained at about 5 by the addition of 50% NaOH as required. The reaction mixture was kept at a pH of about 5 and a temperature of about 0° C. for one hour. Thereafter, the mixture was allowed to warm to room temperature, during which time the pH dropped. The dilute product solution was concentrated by rotary evaporation at reduced pressure to 16.7% solids; the pH of the resulting solution was less than zero.

(D) Cross-linking (I) Pre-cross-linking experiment: Test amounts (e.g, 10 g.) of the chlorohydrin-substituted poly(aminoamideureylene) made in step (C)(I), were dissolved in water at 20–50% solids and added to small vials. To each vial was then added a different amount of a caustic solution (typically 50% NaOH), the amounts ranging from 0.5 to 1.5 molar equivalents in 0.1 molar intervals. The vials were agitated and transferred to an oven held at 60° C. and the time was recorded. The vials were checked periodically for gelling and the amount of caustic sufficient to initiate appreciable gelation (i.e., a visual judgement or perception that gelation occurred) was noted and recorded; if the resin exhibited gelling, it would generally occur within a couple of hours. Depending upon the extent of cross-linking, the particular resin composition, and the solids loading of the test solution, gelation may appear as flocs, a thickened gel, cloudiness, or such other typical indications to the artisan of ordinary skill that gelation has occurred.

(II) Cross-linking: To the main body of the chlorohydrin-substituted polymer, which had a Gardner-Holdt viscosity of less than A, was added the minimum approximate molar equivalent of caustic found to cause appreciable gelation in step (D)(I). The solution was agitated and heated to 60° C. The Gardner-Holdt viscosity was periodically measured, and when the desired viscosity in the range of D to E (measured at approximately 20 wt. % resin solids) was reached, a sufficient amount of 10% HCl was added to bring the solution to about pH 2. The acid-stabilized solution was heated at 60 ° C. for one hour, during which time the pH drifted up slowly as the acid was consumed in converting the epoxide moieties back into chlorohydrins. Periodic additions of HCl were made to maintain the pH near 2. After reaction, the solution was cooled to room temperature, and a final pH readjustment to 2 was made with dilute HCl to finally stabilize the resin.

(E) Activation

Prior to use of the stabilized resin made in step (D)(II), the desired quantity of resin was diluted to about 5% solids with agitation and base-activated by adding 1.3 to 1.5 equivalents of caustic (NaOH, 10% solution) to provide a resin suitable for use in papermaking. While the titration curve for a particular polymer will depend upon its method of preparation, in this example the starting pH was in the vicinity of 2 and the final pH after addition of caustic was in the vicinity of 12.5–13; a final pH in the range of 11 to 14 is generally suitable for using in papermaking. After mixing for about one minute at room temperature, the activated resin solution was added to a furnish.

(F) Wet Strength Additive Use

A 50:50 Rayonier bleached kraft pulp and Weyerhaueser bleached hardwood kraft pulp was beaten at approximately 4.4% consistency in a cycle beater to a Canadian standard freeness of about 500 nil. The pH of the pulp was adjusted to about 7.5 and the pulp was diluted to 0.266% consistency in the proportioner of a standard Noble and Wood handsheet machine. The resin produced in step (E) was evaluated for wet strength in paper by adding about 0.5% of the resin product based on the amount of pulp (i.e., dry basis). The pulp stock was then formed into handsheets having a basis weight of 40 lb. per 3000 ft.$^2$, and the sheets were then dried for one minute at 110° C. The dried sheets were tested for wet strength after soaking for two hours in distilled water at 20° C. The result of a standard wet strength tensile test was 4.1 lb./in. width, compared with 0.5 lb./in. width for handsheets made from untreated pulp.

Furthermore, the present invention provides a novel method for producing hypohalous acid by the acidification of an aqueous hypohalite solution to a pH in the vicinity of 4–6. The hypohalite can be any alkali metal halite. Acidification is preferably accomplished with a mineral acid, such as hydrohalic (e.g., hydrochloric), sulfuric, nitric, and the like; the particular use of the hypohalous acid will suggest to the artisan of ordinary skill a suitable mineral acid. Thus, the present invention also provides a process of forming a halohydrin-substituted quaternized polyamine which comprises providing a polyamine having secondary amine (—NH—) groups in its backbone, reacting the polyamine with an allyl halide to produce a quaternized allylated polyamine, and reacting the quaternized allylated polyamine with hypochlorous acid to produce a quaternized halohydrin-substituted polyamine, characterized in that the hypohalous acid is provided by the acidification of an aqueous solution of an alkali metal hypochlorite. The polyamine can be the poly(aminoamideureylene)s of the present invention, or the various prior art polyamines described above in the Background section; as examples, as described in the Bankert and Maslanka patents. Further, the polymer having halohydrin groups, formed by reaction with hypohalous acid provided by acidification, can be crosslinked as described above by reaction with caustic (where the extent of the prior allylation reaction is less than 100%).

The present invention has been described with reference to the foregoing embodiments and examples without being limited by the particular content thereof, and various additions, substitutions, deletions, and other modifications thereof are intended to be within the scope and spirit of the invention as defined by the following claims.

What is claimed is:

1. A process for producing a polymer, comprising the steps of:

A. reacting (i) a diaminoamine, (ii) a dicarboxylic acid or a derivative thereof, and (iii) urea to produce a poly(aminoamideurylene); and B. reacting the poly(aminoamideureylene) produced in step A. with an allyl halide to produce a quaternized allylated poly(aminoamideureylene) in a yield of ≦99.95.

2. The process defined by claim 1, further comprising the step of:

C. reacting the quaternized allylated poly(aminoamideureylene) produced in step B. with hypohalous acid to produce a quaterized halohydrin-substituted poly(aminoamideureylene).

3. The process defined by claim 2, further comprising the step of:

D. reacting the quaternized halohydrin-substituted poly(aminoamideureylene) produced in step C. with a caustic material in an amount effective to convert the halohydrin substituents to epoxide substituents.

4. The process defined by claim 3, wherein the amount of caustic reacted in step D, is effective to initiate cross-linking of the polymer.

5. The process defined by claim 4, wherein the amount of caustic reacted is effective to provide a polymer having a Gardner-Holdt viscosity in the range of D to E.

6. The process defined by claim 5, further comprising reacting the polymer with an amount of acid sufficient to terminate said cross-linking reaction and provide a cross-linked acid-stabilized polymer.

7. The process defined by claim 6, further comprising reacting the cross-linked acid-stailized polymer with an amount of caustic effective to activate the polymer for use in the manufacture of paper or paperboard products.

8. The process of claim 1, wherein the molar ratio of dicarboxylic acid to urea is in the approximate range of between 4:1 and 1:4.

9. The process defined by claim 8, wherein the molar ratio of dicarboxylic acid to urea is in the approximate range of between 3:1 and 1:3.

10. The process defined by claim 9, wherein the molar ratio of dicarboxylic acid to urea is in the approximately range of between 2:1 and 1:2.

11. The process defined by claim 1, wherein the hypohalous acid is hypochlorous acid.

12. The process defined by claim 11, wherein the hypochlorous acid is provided by chlorine sparging an aqueous solution of the quaternized allylated poly(aminoamideurelyene).

13. The process defined by claim 11, wherein the hypochlorous acid is provided by acidifying an aqueous solution of an alkali metal hypochlorite.

14. The process defined by claim 1, wherein the diaminoamine is of the formula $NR^1(R^2NH_2)_2$, wherein $R^1$ is an alkyl group, and the two $R^2$ moieties, which may be the same or different, are each independently chosen as an alkyl group.

15. The process defined by claim 14, wherein the diaminoamine is methylbis(3-aminopropyl)amine.

16. The process defined by claim 1, wherein the dicarboxylic acid is of the formula HOOC—$R^3$—COOH, wherein $R^3$ is a $C_{1-3}$ alkyl group or is omitted.

17. The process defined by claim 16, wherein the dicarboxylic acid is oxalic acid.

18. The process defined by claim 1, wherein the allyl halide is of the formula $XCH_2—CH_2)_zCH{=}CH_2$, in which X is a halogen, z is a positive integer of 5 or less or is zero, and wherein the hydrocarbyl chain is optionally branched.

19. A process of using the polymer prepared by the process of claim 1 which comprises: providing a furnish suitable for the manufacture of paper or paperboard products; providing said polymer in an aqueous solution; and adding said solution to said furnish in an amount effective to increase the wet strength of the product.

20. The process defined by claim 19, wherein the added solution comprises 0.01% to 10% by weight of the polymer based on the dry weight of the furnish.

21. A process of making a paper or paperboard product, which comprises: providing a furnish suitable for making said product; providing the polymer prepared by the process of claim 1 in an aqueous solution; adding said solution to said furnish in an amount effective to increase the wet strength of the product; forming a wet-laid sheet from said furnish; and drying said wet-laid sheet to form a paper or paperboard product.

22. The process defined by claim 21, wherein the added solution comprises 0.01% to 10% by weight of the polymer based on the dry weight of the furnish.

23. The process defined by claim 21, wherein the polymer is defined by claim 11.

24. A process of forming a polymer, comprising the steps of:

A. providing a polyamine polymer having secondary amine (—NH—) groups in its backbone;

B. reacting said polyamine with an allyl halide to produce a quaternized allylated polyamine; and C. reacting the quaternized allylated polyamine produced in step B. with hypochlorous acid to produce a quaternized halohydrin-substituted polyamine, characterized in that said hypohalous acid is provided by the acidification of an aqueous solution of an alkali metal hypochlorite.

25. The process defined by claim 24, further comprising the step of:

D. reacting the quaternized halohydrin-substituted polyamine with a caustic material in an amount effective to initiate cross-linking of the polymer.

26. The process defined by claim 25, wherein the amount of caustic material is effective to provide a polymer having a Gardner-Holdt viscosity in the range of D to E.

27. The process defined by claim 25, further comprising the step of terminating said cross-linking by the addition of an amount of acid effective to provide a cross-linked acid-stabilized polymer having halohydrin substituents.

28. The process defined by claim 27, further comprising the step of reacting the cross-linked acid-stabilized polymer with an amount of caustic material effective to activate the polymer for use in the manufacture of paper or paperboard products.

29. A process for producing a polymer having halohydrin substituents, comprising: providing an allylated polymer having allyl groups; and reacting the allylated polymer with hypohalous acid, wherein the pH of the reaction is not controlled.

30. The process defined by claim 29, wherein the allylated polymer is a polyamine having allyl groups pendant from its backbone.

31. A process for the production of hypohalous acid, comprising: providing an aqueous solution of an alkali metal hypohalite; and acidifying said aqueous solution with an amount of mineral acid effective to produce said hypohalous acid.

32. The process defined by claim 31, wherein the mineral acid is hydrochloric acid.

33. The process defined by claim 31, wherein the alkali metal hypohalite is sodium hypohalite.

34. The process defined by claim 31, wherein the amount of mineral acid is effective to produce a pH in the range of 4 to 6.

* * * * *